United States Patent [19]

Müller-Horsche

[11] Patent Number: 5,247,534
[45] Date of Patent: Sep. 21, 1993

[54] PULSED GAS-DISCHARGE LASER

[75] Inventor: Elmar Müller-Horsche, Göttingen, Fed. Rep. of Germany

[73] Assignee: Lambda Physik Forschungsgesellschaft mbH, Göttingen, Fed. Rep. of Germany

[21] Appl. No.: 858,693

[22] Filed: Mar. 27, 1992

[30] Foreign Application Priority Data

Apr. 23, 1991 [DE] Fed. Rep. of Germany ....... 4113241

[51] Int. Cl.$^5$ .............................................. H01S 3/22
[52] U.S. Cl. .................................... 372/58; 372/87; 372/5; 372/86; 372/61
[58] Field of Search .................. 372/86, 87, 69, 61, 372/5, 58, 61

[56] References Cited

U.S. PATENT DOCUMENTS 5,033,059 7/1991 Perzl et al. ............................ 372/86
5,048,045 9/1991 Noda et al. ............................ 372/86
5,097,475 3/1992 Perzl et al. ............................ 372/86

Primary Examiner—Léon Scott, Jr.
Attorney, Agent, or Firm—Brumbaugh Graves Donohue & Raymond

[57] ABSTRACT

A pulsed gas-discharge laser, in particular an excimer laser, comprises main discharge electrodes (10, 10a) of erosion-resistant metal between which laser gas flows with high velocity to replace the laser gas between the main discharge electrodes from laser pulse to laser pulse. For preionizing the laser gas two X-ray radiation sources (30, 30a) are arranged adjacent one main discharge electrode (10). The flow path (18) of the laser gas is formed partially by flow bodies (16, 16a, 32, 32a) which consist of a material which has a high secondary emissive power with regard to the X-ray radiation. The secondary radiation is so configured that it promotes the preionization.

6 Claims, 2 Drawing Sheets

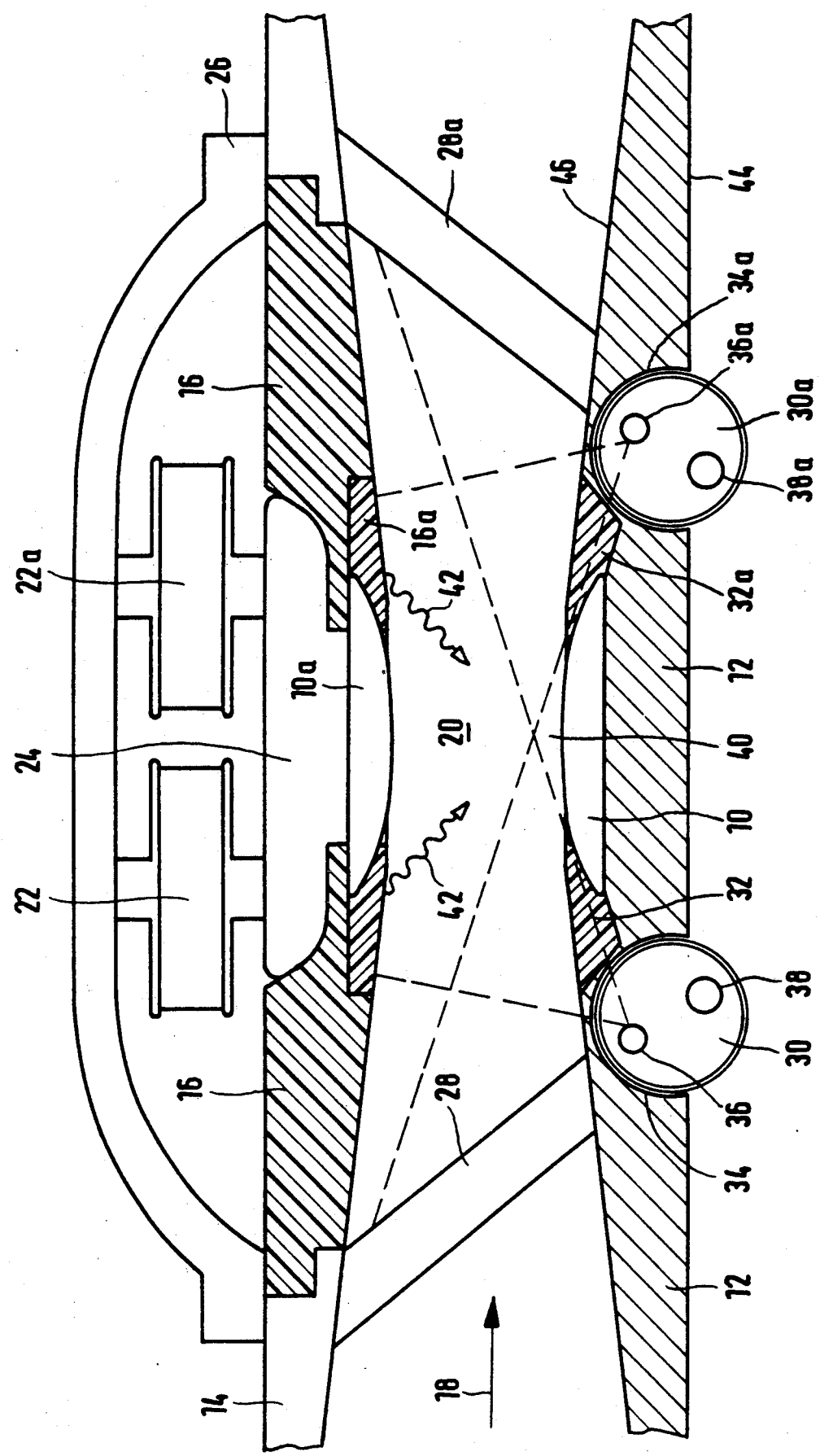

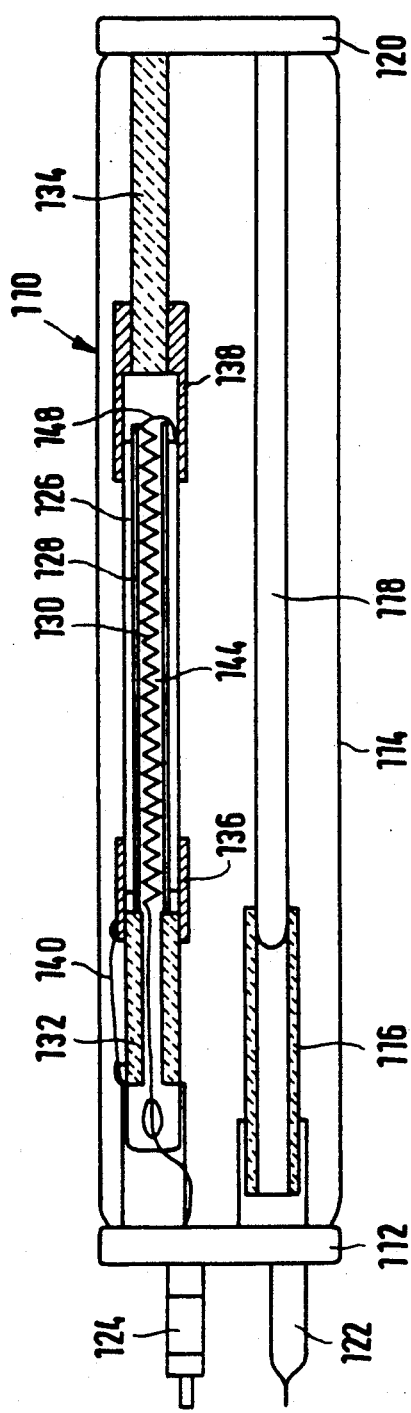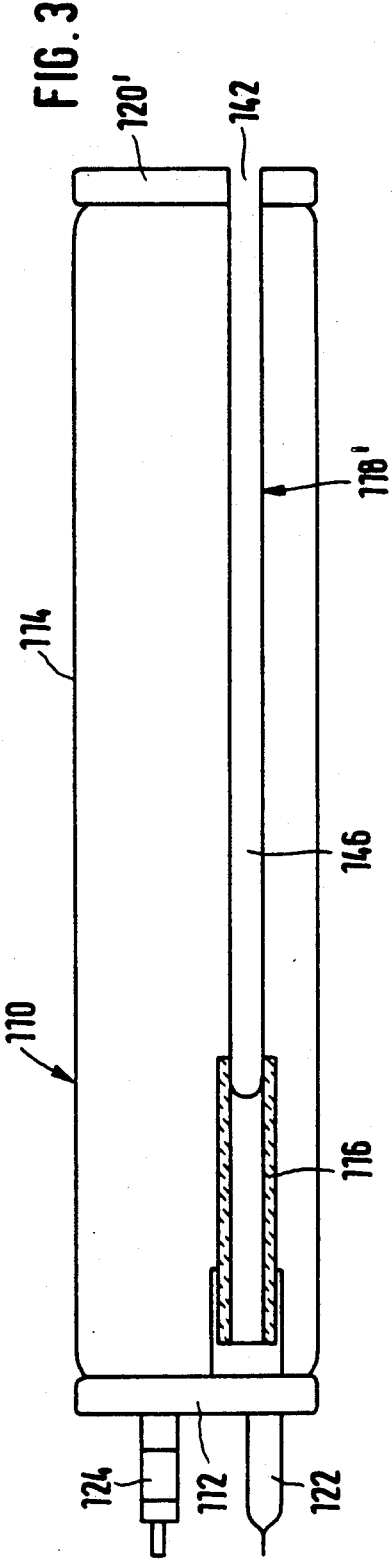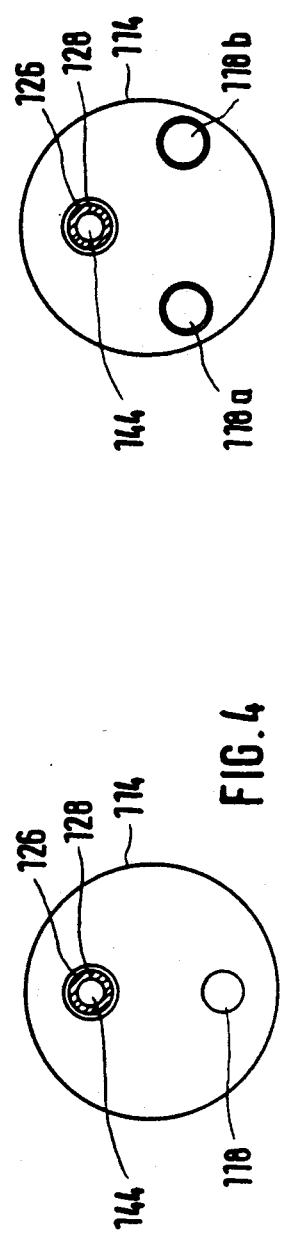

PULSED GAS-DISCHARGE LASER

The invention relates to a pulsed gas-discharge laser comprising main discharge electrodes of erosion-resistant metal between which laser gas flows with high velocity to replace the laser gas between the main discharge electrodes from laser pulse to laser pulse, and at least one X-ray radiation source for preionizing the laser gas between the main discharge electrodes.

Pulsed gas lasers are known in a great variety of configurations, in particular as $CO_2$ laser, excimer laser or $N_2$ laser, etc. A widely adopted feature in pulsed gas lasers is a socalled transverse stimulation of the laser gas in the form of a gas discharge (also referred to as main or plasma discharge).

It is likewise known to subject the laser gas before the main discharge to a socalled preionization in which prior to the actual main discharge as homogeneous as possible a distribution of free electrons (about $10^7$ electrons/cm$^3$) in the discharge space is generated. Such a preionization of the gas serves in particular to avoid the main discharge occurring as arc discharge. After the preionization, the main discharge referred to then starts between the main electrodes and in said discharge the electron concentration in the socalled avalanche phase becomes greater by several orders of magnitude, for example increases to $10^{14}$ to $10^{15}$ electrons/cm$^3$.

As a rule, for the preionization in the prior art external energy sources, for example UV light, i.e. sources separate from the actual main discharge are used. Such UV radiation may for example be emitted by spark gaps or also by corona discharges.

Although spark gaps are extremely effective, they have the disadvantage that they form a contamination source for the laser gas and also for the optical components of the laser resonator. The efficiency of a preionization by means of UV radiation is restricted in particular by the fact that the range of the ionizing UV radiation is restricted to a few centimeters (cf. K. Midorikawa, M. Obara, T. Fujiokam, IEEE QU-20, 1984, p. 198).

In elder German patent application P 41 08 472, which was not prior published, corresponding to co-pending U.S. patent application Ser. No. 07/849,761, filed Mar. 12, 1992, assigned to the present assignee, it is proposed that soft X-ray radiation be used for the preionization in a gas-discharge laser, in particular an excimer laser. A reliable X-ray tube is described therein which can be economically made and is simple to operate and which supplies the necessary dose power for the preionization in a pulsed gas laser and in addition has a long life.

Another factor to be considered in the preionization of excimer gas mixtures is that in said gas mixtures electronegative gases, such as HCl or $F_2$, are also present which greatly reduce the life of the free electrons, for example to a few nanoseconds (the free electrons are "captured" by the electronegative gases). Consequently, here as well the preionization must take place in a very short time pulse of a few nanoseconds. To achieve the electron concentration of for example $10^7$ cm$^{-3}$ necessary for good preionization in this short period of time, the X-ray radiation source must have a very high peak intensity in this short period of time. Converted to the anode current of a X-ray tube this requirement means anode currents of 500 to 1000 A. Conventional X-ray tubes have in contrast emission currents of at the most a few amperes.

In EP 0 336 282 A1 a plasma cathode is described which however for its operation requires a gas pressure which must be exactly maintained and additional voltage pulses for various control grids and control electrodes.

With pulsed gas-discharge lasers, in particular excimer lasers, to which the present invention preferably relates, it is necessary between the individual laser pulses to replace completely the gas in the discharge space between the main discharge electrodes since otherwise long-life stimulated particles (molecules, ions) formed in the discharge would have a disturbing effect during the next laser pulse.

This gas replacement is usually achieved in that the laser gas is conducted in a flow between the main discharge electrodes. To obtain a complete replacement a flow velocity of the laser gas depending on the pulse recurrence frequency of the laser is required. It has been found that to obtain good results the laser gas in the discharge volume must be replaced about two to three times between the individual laser pulses in order to achieve adequate "flushing" and thus a complete substitution of the gas.

In the case of high-power lasers in the power range of several kilowatts with pulse repetition rates of 0.5 to 2 KHz, this gas replacement requires gas velocities of 50 to 150 m/sec. The present invention relates in particular to such very high power lasers. With such flow velocities the flow path of the laser gas in the gas circuit must be configured aerodynamically in order to obtain the minimum possible flow resistance. Otherwise, more power would be consumed in the fan of the gas circulation than in the electrical gas discharge itself.

With regard to such an aerodynamic configuration of the flow path of the laser gas the aforementioned preionization represents a particular complication. For the components known for a preionization in the prior art represent a considerable flow resistance and they are positioned at locations in the gas circuit where the highest flow velocities must be achieved, i.e. in the region of the main discharge electrodes of the laser. When using socalled auxiliary electrodes for the preionization (spark discharge) it is moreover to be remembered that not only the space between the main electrodes but also the space in the region of the auxiliary electrodes must be flushed and filled with fresh gas from laser pulse to laser pulse.

Admittedly, these problems can be avoided on using socalled net electrodes behind which either the UV radiation generating means is arranged or which in the case of an X-ray preionization serve as X-ray windows towards the discharge volume; however, such net or gauze electrodes have the disadvantage that they permit only short lives.

It is possible to use in a preionization of the laser gas by means of X-ray radiation a thin shaped sheet of light metal (for example aluminium or titanium) as main discharge electrode, the preionization taking place through said electrode. However, the requirements here of a high transparency for the X-ray radiation on the one hand and erosion resistance on the other are opposing demands which are hardly compatible.

Compared with such thin metal sheets solid main discharge electrodes have the advantage of high erosion resistance and the electrode contour can be configured in such a manner that a uniform distribution of the electrical field in the discharge space is obtained. The present invention therefore proceeds from the use of main discharge electrodes which are solid and which permit the aforementioned advantages.

The invention is based on the problem of making available a pulsed gas-discharge laser in which both an effective preionization and a low flow resistance for the flow of the laser gas can be achieved with simple means.

According to the invention this problem is solved in a pulsed gas-discharge laser of the type mentioned at the beginning in that the flow path of the laser gas is at least partially limited by flow bodies which consist of a material having a high secondary emissive power with regard to the X-ray radiation and which are so arranged that their secondary radiation promotes the preionization. The term "flow body" is to be understood here to mean that the body on the one hand limits or defines the flow path for the laser gas and on the other has a low flow resistance for the laser gas.

The flow bodies thus generate a smooth uninterrupted flow path in the region of the main electrodes.

The invention therefore utilizes the knowledge that it is possible by means of flow bodies firstly to keep the flow resistance for the flowing laser gas small in the critical region between the main discharge electrodes and secondly to utilize said flow bodies also for improving the preionization by selecting their material in such a manner that it has a high secondary emissive power with regard to incident X-ray radiation and thus promotes the preionization. As materials with high secondary emissive power with regard to X-ray radiation, in particular plastics are known, such as polytetrafluoroethylene or polyvinylidene fluoride, both of said materials being particularly suitable for excimer lasers, to which the invention is preferably applied.

In a preferred further development of the invention the main discharge electrodes of the laser are mainly embedded into the flow bodies.

According to a further preferred development of the invention two X-ray radiation sources are arranged adjacent and on either side of one of the main discharge electrodes.

A particularly compact arrangement of the main electrodes and the preionization means requiring few components is obtained if the X-ray radiation sources are arranged in recesses in the support of the one main discharge electrode, the recesses being formed in the side of the support which is remote from the flow path.

If X-ray radiation sources are arranged aerodynamically with respect to the main discharge electrodes of the laser, then generally a radiation shadow with respect to the X-ray radiation results, i.e. areas exist between the main discharge electrodes which are not reached by the X-ray radiation or are reached thereby only to a reduced extent. The invention provides a remedy for this in that the flow bodies having a high secondary emissive power with respect to the X-ray radiation are so positioned that they irradiate in particular those regions of the space between the main discharge electrodes which otherwise lie in the shadow of the X-ray radiation.

Hereinafter an example of embodiment of the invention will be described in detail with the aid of the drawings, wherein:

BRIEF DESCRIPTION OF THE DRAWINGS

FIG. 1 shows schematically a section through an excimer laser in the region of its main discharge electrodes.

FIG. 2 is an axial section through an X-ray tube;

FIG. 3 is an axial section through an example of embodiment of an X-ray tube modified compared with FIG. 2;

FIG. 4 is a radial section through an X-ray tube according to FIG. 2, and

FIG. 5 is a radial section through a modified example of embodiment of an X-ray tube.

The main discharge electrodes 10, 10a are made solid from metal and thus erosion-resistant to a high degree. Moreover, their outer contour is so configured that as homogeneous as possible an electrical field distribution is achieved. This is known per se in the prior art.

The main discharge electrode 10 shown at the bottom in the Figure is grounded in the example of embodiment illustrated (connected to "ground") and thus need not be electrically insulated. Said main discharge electrode 10 is supported by a support 12 of for example aluminium which in small material thicknesses is transparent to X-ray radiation.

The other main discharge electrode 10a in the example of embodiment illustrated is insulated so that a high voltage can be applied. A support 14 for this main discharge electrode 10a is therefore provided with a flow body 16 of electrically insulating material, the flow body 16 having a section 16a into which the main discharge electrode 10a is embedded and which can be mounted along with the electrode (and possibly replaceable).

The laser gas flows in the direction of the arrow 18 in the Figure from the left to the right between the main discharge electrodes 10, 10a. The arrow 18 thus marks the flow path of the laser gas. The remaining parts of the flow path of the laser gas (fan, etc.) are not shown here because they are known per se to the person skilled in the art.

The flow of the laser gas through the discharge space 20 takes place at such a high velocity that even with the high pulse repetition rates mentioned above of the order of magnitude of several KHz a complete flushing of the space 20 between the main discharge electrodes takes place and thus each laser pulse is effected with fresh laser gas.

The Figure also shows discharge capacitors 22, 22a, a field-shaping body 24, a pressure cover ground feedback 26 and current feedbacks 28, 28a which are known per se to the person skilled in the art and need not be described in detail here.

The field-shaping bodies serve to influence the electrical field in the discharge zone and along the insulation surfaces of the parts 16, 16a. In particular, by the field-shaping bodies, concentrations of the electrical field at the electrode edge are avoided.

The ground feedback generates a closed circuit via the discharge capacitors 22, 22a and via the discharge between the electrodes. The parts 28, 28a and 26 serve this purpose. Since the plastic flow bodies 16 do not have adequate mechanical stability and a very high pressure (about 4 bar excess pressure) obtains in the discharge zone, the mechanical loading of the electrodes 10a by the internal pressure is taken up by the solid parts 26 (pressure cover) and 22, 22a (ceramic capacitors).

The current feedbacks 28, 28a are disposed in the gas flow and are therefore made grid-like and aerodynamic in order to reduce the flow resistance. The current feedbacks 28, 28a are thus configured in a section perpendicular to the plane of the drawing of FIG. 1 in such a manner that they have the minimum possible flow resistance with respect to the gas flow.

An X-ray radiation source 30 and 30a is arranged on either side directly adjacent the grounded main discharge electrode 10. For this purpose, in the support 12 (of aluminium) on the side 44 thereof remote from the flow path 18 of the laser gas respective recesses 34, 34a are formed adjacent the main electrode 10 and into said recesses the X-ray radiation sources 30, 30a (see below) are fitted. The recesses 34, 34a are so formed that on the side 46 of the support 12 facing the flow path 18 in each case only thin layers of the support 12 remain and these do not form any appreciable obstruction to the X-ray radiation, i.e. are permeable to said radiation.

Furthermore, the support 12 is milled out on its side 46 facing the flow path 18 adjacent the electrode 10 to accommodate flow bodies 32, 32a in such a manner that on the one hand they engage the electrode 10 in the side region thereof and on the other the X-ray radiation generated by the X-ray radiation sources 30, 30a passes through said flow bodies 32, 32a.

The X-ray radiation sources 30, 30a each have anodes 36 and 36a and cathodes 38 and 38a respectively and will be described in detail hereinafter.

The flow bodies 16, 16a, 32, 32a provide firstly a streamlined contour in the laser channel as regards the flow path 18 and secondly consist of plastics which only slightly absorb the radiation emanating from the X-ray radiation sources 30, 30a. Particularly suitable for this purpose are the plastics polytetrafluoroethylene and polyvinylidene fluoride, being suitable especially also for excimer lasers. Since they are made up of atoms of low atomic number (hydrogen, carbon and fluorine) and because of the relatively soft X-ray radiation employed (acceleration voltage of about 70 KV), these atoms show a pronounced tendency to scatter the incident X-ray radiation by the Compton or Rayleigh effect. As a result, an effective preionization of the laser gas occurs even in the regions of the space 20 between the main discharge electrodes 10, 10a which are initially shaded by the electrodes 10, 10a from the X-ray radiation sources and thus cannot be struck by their direct radiation. This applies in the example of embodiment according to FIG. 1 in particular to the shadow space 40 near the electrode 10. The Compton scattering leads to a direction of the quantum energy of the radiation after the scattering, i.e. the radiation produced by the Compton effect is still softer than the primary X-ray radiation of the sources 30, 30a and is therefore even better absorbed by the laser gas, i.e. the preionization of the scattered radiation is extremely effective.

This positive effect as regards the preionization by means of scattered radiation is utilized in accordance with FIG. 1 also in the region of the upper electrode 10a driven with high voltage. Said electrode 10a is embedded into the flow body 16a of one of the aforementioned plastics so that the X-ray radiation emanating from the anodes 36, 36a produces scattered and secondary radiation in the flow body 16a which is indicated in the Figure by the reference numeral 42. This radiation reaches in particular the "shadow space" 40 unobstructed so that said space is irradiated both by secondary radiation from the flow body 16a and by secondary radiation from the flow bodies 32, 32a and consequently the preionization is homogeneous and intensive in the entire space 20 between the main electrodes.

The arrangement described above with reference to FIG. 1 thus has the advantage that all the components required for the preionization of the laser gas do not impede the gas flow. With the arrangement illustrated the use solid main discharge electrodes 10, 10a is possible, thereby permitting a long operating life of the gas-discharge module of the laser.

Hereinafter the X-ray radiation sources 30, 30a will be described in detail (elder application P 41 08 472).

The X-ray source described in detail below is a vacuum tube in the original sense of that term. Consequently, for the operation thereof no vacuum pumps are necessary and furthermore no gas dosage means are required. Nor are any additional voltage pulses required for control grids and control electrodes. The only operating voltages required are a heating voltage for heating the cathode and a pulse-like accelerating voltage at the anode.

In accordance with FIG. 2 and the corresponding radial section of FIG. 4, the X-ray tube 110 comprises a base plate 112 which serves as mounting flange and carries a housing 114. In the example of embodiment illustrated the housing 114 is a glass tube which is transparent to the soft X-ray radiation generated.

On the base plate 112 an anode holder 116 is mounted which supports the elongated, tubular or rod-like anode 118. On the side of the elongated tubular housing 114 of electrically insulating material opposite the base plate 112 a counter plate 120 is mounted so that the interior of the housing 114 is sealed vacuum tight.

In the production of the X-ray tube 110 the latter is evacuated, possibly with corresponding baking in the operating state, and sealed off at a glass tube 122. Thereafter the X-ray tube is ready for operation without further evacuating steps.

The base plate 112 carries an electrical bushing 124 via which the heating current can be transferred to the interior of the X-ray tube.

In the example of embodiment illustrated a cathode 126 which is made tubular is provided. The length of the cathode and correspondingly the length of the anode are so chosen that these dimensions are adapted to the laser gas discharge volume.

To achieve high emission currents the tubular cathode 126 consists of porous tungsten (socalled dispenser cathode). This material is distinguished by a very low operating temperature of 1000° to 1100° C. and is known per se.

A particularly simple reliable constructional form having a long life is obtained if the tubular cathode is heated to the necessary temperatures with the aid of a heating coil 136 (electrical resistance heating). The cathode 126 is hollow on the inside and a ceramic tube 128 separates the cathode 126 from the heating coil 130.

Corresponding to the anode 118 the cathode 126 is also axially supported on both sides, this being done by insulating cathode holders 132, 134.

Metal sleeves 136, 138 are shrunk onto the cathode holders 132, 134 formed from ceramic so that the cathode 126 is supported in electrically and thermally insulated manner.

Via an electrical conductor 140 the cathode 126 is at ground potential (as is the base plate 112). Consequently, an electrical insulation with respect to the anode 118 is necessary. A pulsed high voltage (not shown in detail) is applied to the anode 118.

It has been found that to obtain optimum preionization results and a long life of the cathode special dimensions are advantageous. Favourable values were obtained with a cathode internal diameter of 6 mm, a cathode external diameter of 8 mm, an external diameter of the heating coil of 4.5 mm and a pitch of the heating coil of 1.5 mm as well as a wire diameter of the heating coil of 0.7 mm. Deviations from these values of up to 30% also furnished good results.

The feedback of the heating current may be effected via the cathode itself, cf. the conductor 148 according to FIG. 2.

An important factor is a uniform coil pitch of the heating coil 130 in order to obtain a requirement important to the operation of the X-ray tube, i.e. a homogeneous temperature distribution over the entire cathode length. The heating power required with the aforementioned values is about 25 W per cm cathode length and the heating current is about 12 A.

In a modification of the example of embodiment described above the cathode heating may also be effected by electron bombardment. In this case, a heating wire hung tensioned concentrically with the cathode tube would have to be operated with a few KV negatively with respect to the cathode.

In its simplest configuration according to FIG. 2, the anode 118 consists of a metal rod having a diameter of 6 mm (with deviations of 30%) and is mounted about 13 mm away from the cathode 126. The anode holder 116 consists of an electrically insulating material, for example ceramic. For a high X-ray yield an anode material as heavy as possible should be chosen. Tungsten and tantalum have proven suitable. It has also been found suitable to operate the X-ray tube 110 with 70 KV anode peak voltage, a pulse width of 30 ns and a repetition rate of up to 500 Hz.

If still higher pulse repetition rates are desired the anode can be cooled to avoid excessive operating temperatures. Such a cooling is illustrated in FIG. 3 in a modification of the example of embodiment of FIG. 2. FIG. 3 also shows, corresponding to FIG. 2, an axial section through an X-ray tube 110, the cathode and the components associated therewith being formed correspondingly to FIG. 2 and therefore not shown again. The modification concerns the anode 118' which in the example of embodiment according to FIG. 3 is made hollow on the inside. The cavity 146 of the anode 118' can be connected via a passage 142 to a reservoir for cooling liquid which is arranged outside the housing 114. The cooling may for example take place with oil. The electrical potential of the anode is defined by the potential of the counter plates 120 and 120' to which the anode is electrically connected.

The electrical driving of the anode is effected via the counter plate 120 or 120' to which it is electrically connected.

With the above dimensions the X-ray tube can be operated at 70 KV anode peak voltage near the space charge limit of about 20 A per cm diode length. The operation in the region of this saturation value has the advantage that the X-ray emission current is no longer very dependent on the cathode temperature so that stable operating conditions can be achieved without a sensitive setting of the parameters.

FIG. 5 shows a modification of the example of embodiment, two anodes 118a, 118b being arranged triangularly opposite a cathode 126. This arrangement is advisable for example when the X-ray tube 110 is to irradiate primarily upwardly (seen in the direction of the Figures). The emission current in this arrangement is no longer space-charge limited but on the contrary results from the emission power of the cathode at the operating temperature set or from the impedance of the high-voltage pulse generator.

It is also possible o improve the stability of the vacuum by a socalled getter material.

After the assembly of the components described above the X-ray tube 110 is first evacuated, baked and then activated in accordance with the recommendations of the cathode manufacturer, the cathode being heated for a short time above its normal operating temperature. Thereafter the housing 114 is sealed vacuum tight, for example by sealing off the glass tube 122 to which the vacuum pump was previously connected. Then, the X-ray tube can be operated for years without additional evacuation steps. The structure of the X-ray tube described has proved to be robust and of long life. The compact configuration with the dimensionings indicated makes it possible to position the X-ray source in the immediate vicinity of the discharge space to be preionized.

I claim:

1. A pulsed gas-discharge laser receiving a refreshed quantity of laser gas in a laser gas flow path within the gas-discharge laser prior to generation of a laser pulse by said pulsed gas-discharge laser, said pulsed gas-discharge laser including:

a plurality of erosion-resistant metal main discharge electrodes having a refreshed quantity of laser gas located therebetween;

at least one X-ray radiation source arranged on a side of one of said plurality of erosion-resistant metal main discharge electrodes for generating X-ray radiation for preionizing the laser gas between the erosion-resistant metal main discharge electrodes; and a plurality of flow bodies arranged at a flow path adjacent to said main discharge electrodes, said plurality of flow bodies having a high secondary X-ray emissive power with regard to X-ray radiation impinging onto said flow bodies to promote preionization of the refreshed quantity of laser gas located between the plurality of erosion-resistant metal main discharge electrodes.

2. A gas-discharge laser according to claim 1, characterized in that each of the plurality of erosion resistant metal main discharge electrodes is partially embedded into the flow bodies.

3. A gas-discharge laser according to claim 1, characterized in that two X-ray radiation sources are arranged adjacent and on either side of one of the main discharge electrodes.

4. A gas-discharge laser according to claim 3, characterized in that the X-ray radiation sources are arranged in recesses in a support of the main discharge electrode, the recesses being formed in the side of the support (12) which is remote from the flow path.

5. A gas-discharge laser according to claim 1, characterized in that the plurality of flow bodies consist of electrically insulating plastic positioned to irradiate X-ray shadow regions of a space between the main discharge electrodes.

6. A pulsed gas-discharge laser receiving a refreshed quantity of laser gas in a laser gas flow path within the gas-discharge laser prior to generation of a laser pulse by said pulsed gas-discharge laser, said pulsed gas-discharge laser including:
a plurality of erosion-resistant metal main discharge electrodes having a refreshed quantity of laser gas located therebetween wherein said main discharge electrodes are embedded into a body surface which smoothly defines the laser gas flow path.

* * * * *